(12) United States Patent
Wang et al.

(10) Patent No.: US 12,399,481 B2
(45) Date of Patent: Aug. 26, 2025

(54) VERSATILE ANOMALY DETECTION SYSTEM FOR INDUSTRIAL SYSTEMS

(71) Applicant: Hitachi, Ltd., Tokyo (JP)

(72) Inventors: Qiyao Wang, Los Gatos, CA (US); Wei Huang, Campbell, CA (US); Ahmed Farahat, Santa Clara, CA (US); Haiyan Wang, Fremont, CA (US); Chetan Gupta, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 664 days.

(21) Appl. No.: 17/730,007

(22) Filed: Apr. 26, 2022

(65) Prior Publication Data

US 2023/0341832 A1    Oct. 26, 2023

(51) Int. Cl.
G05B 19/4063    (2006.01)

(52) U.S. Cl.
CPC ........ *G05B 19/4063* (2013.01); *G05B 2219/14036* (2013.01)

(58) Field of Classification Search
CPC ...... G05B 19/4063; G05B 2219/14036; G05B 2219/21126; G05B 23/0221
See application file for complete search history.

(56) References Cited

U.S. PATENT DOCUMENTS

| | | | |
|---|---|---|---|
| 11,636,125 B1 * | 4/2023 | Carmona Perez | G06N 3/08 707/736 |
| 2013/0046507 A1 * | 2/2013 | Vega Paez | F01D 21/00 702/179 |
| 2022/0036133 A1 * | 2/2022 | Wigglesworth | G06F 11/3024 |

FOREIGN PATENT DOCUMENTS

| | | |
|---|---|---|
| CN | 112363896 A | 2/2021 |
| KR | 1020210081077 A | 7/2021 |
| WO | 2008070328 A2 | 6/2008 |

OTHER PUBLICATIONS

Japanese Office Action dated Sep. 25, 2023, in counterpart Japanese Application No. 2022-172325.
Extended European Search Report dated Sep. 20, 2023, in counterpart European Application No. 23165694.3.
Liu et al., "Noise Removal in the Presence of Significant Anomalies for Industrial IoT Sensor Data in Manufacturing," IEEE Internet of Things Journal, vol. 7, No. 8, Mar. 17, 2020, pp. 7084-7096, XP011804008, DOI: 10.1109/JIOT.2020.2981476, retrieved on Aug. 11, 2020.

* cited by examiner

*Primary Examiner* — Rami R Okasha
(74) *Attorney, Agent, or Firm* — Procopio, Cory, Hargreaves & Savitch LLP (57) ABSTRACT

A method for detecting an anomaly in time series sensor data. The method may include identifying a noisiest cycle from the time series sensor data; for an evaluation of the noisiest cycle indicative of the anomaly being detected at a confidence level above a threshold, providing an output associated with the noisiest cycle as being the anomaly; and for the evaluation of the noisiest cycle indicative of the anomaly being detected at the confidence level not above the threshold: identifying a cycle from the time series sensor data having a most differing shape; and providing the output associated with the cycle having the most differing shape as being the anomaly.

13 Claims, 9 Drawing Sheets

VERSATILE ANOMALY DETECTION SYSTEM FOR INDUSTRIAL SYSTEMS

BACKGROUND

Field

The present disclosure is generally directed to a method and a non-transitory computer readable medium to facilitate anomaly detection in industrial systems.

Related Art

Anomaly detection in industrial AI is the task of detecting outlying deviations from normal behaviors or patterns using Key Performance Indicator (KPI) over time, such as sensor time series data recorded by sensors attached to industrial systems. It is an important topic with a sizable impact on different verticals of industrial AI including prognostics and health management, operation optimization, and quality improvement.

There are three challenges when designing effective and accurate anomaly detection systems. First, anomalous behaviors (i.e., deviation from normal working patterns) can come in diverse formats. In practice, it is crucial to accurately identify these anomalous behaviors so that the right intervention or remedial actions can be promptly taken.

Second, periodicity in sensor data from industrial systems is often not constant. Possible reasons why inconstant periodicities commonly exist include the changing working load over time (i.e., high working loads often result in faster working cycles), the unstable working conditions (i.e., unstable lubrication condition of bearings results in variations in working cycle length. To accurately detect anomalies, it is important to account for this behavior so that the algorithm marks the actual abnormal pattern as an anomaly rather than the cycles within the normal range of length variations.

Lastly, anomaly can be scarce, due to the robustness of industrial systems. There is often a limited number of historical anomaly data available to train data-driven anomaly detection models. A practically feasible model should be able to be built even when not many or even no historical anomalies are attainable.

In the related art, there are several existing data-driven methods applicable to anomaly detection in industrial systems. These methods first divide time series into a sequence of data windows of a fixed predetermined size and then identify the anomalous windows that are not alike the normal windows.

1) Summary statistics-based methods calculate certain statistics for each window (e.g., mean, standard deviation) and mark the window of data with extremely large or small valued summary statistics as the anomaly.
2) Statistical distribution-based approaches use normal windows to estimate the statistical distribution of normal windows and consider the window with a low likelihood of belonging to the learned distribution as the anomaly.
3) Forecasting-based methods forecast future windows for each window. The anomaly is the window with the largest discrepancy between the forecasted data and the actual data.
4) Classification-based methods build a classification model to sort out normal windows from abnormal windows.
5) Auto-encoder-based methods build an auto-encoder model to learn lower rank representations of normal windows. The anomaly is the window with the largest discrepancy between the actual data and the reconstructed data using the learned lower rank representation.
6) Matrix profiling with Euclidean distance calculates the minimal Euclidean distance with the remaining windows for each window. The anomaly is the window with the largest minimal Euclidean distance, i.e., the window that does not resemble any windows.

In practice, existing anomaly detection methods often cannot appropriately handle the practical challenges discussed above. First, all current methods are not explicitly designed to handle various formats of anomalies, as exhibited through poor accuracies in practice. Second, all current methods work with a fixed window size of data without allowing alignments and therefore cannot appropriately account for the inconsistent periodicity among the sensor time series. Lastly, classification-based methods often require a relatively large number of anomalous data to be trained.

Besides the limitation discussed above, the existing approaches often consider only one window size. This makes their performance to be sensitive to the selected sliding window size co. For the matrix profiling approach, when window size is too small, the scoring gets noisy with large number of prominent scores. On the other hand, when the window size is too big, the scoring of the anomalous window is not indistinguishable from the other normal windows.

SUMMARY

Example implementations described herein are directed to innovative and versatile data-driven method and non-transitory computer readable medium that not only explicitly account for the diverse types of anomalies and the inconstant periodicity, but also require no anomaly data to be developed. In addition, ensemble of multiple sliding window lengths is implemented to stabilize the detection. An adaptive approach is also used to identify good ensembles based on the characteristics of each time series.

Aspects of the present disclosure involve an innovative method for detecting an anomaly in time series sensor data. The method may include identifying a noisiest cycle from the time series sensor data; for an evaluation of the noisiest cycle indicative of the anomaly being detected at a confidence level, providing an output associated with the noisiest cycle as being the anomaly; and for the evaluation of the noisiest cycle indicative of the anomaly being detected not at the confidence level: identifying a cycle from the time series sensor data having a most differing shape; and providing the output associated with the cycle having the most differing shape as being the anomaly.

Aspects of the present disclosure involve an innovative non-transitory computer readable medium, storing instructions for detecting an anomaly in time series sensor data. The instructions may include identifying a noisiest cycle from the time series sensor data; for an evaluation of the noisiest cycle indicative of the anomaly being detected at a confidence level, providing an output associated with the noisiest cycle as being the anomaly; and for the evaluation of the noisiest cycle indicative of the anomaly being detected not at the confidence level: identifying a cycle from the time series sensor data having a most differing shape; and providing the output associated with the cycle having the most differing shape as being the anomaly.

Aspects of the present disclosure involve an innovative management server system, for detecting an anomaly in time series sensor data. The management server may include a processor, configured to identify a noisiest cycle from the time series sensor data; for an evaluation of the noisiest cycle indicative of the anomaly being detected at a confidence level, provide an output associated with the noisiest cycle as being the anomaly; and for the evaluation of the noisiest cycle indicative of the anomaly being detected not at the confidence level: identify a cycle from the time series sensor data having a most differing shape; and provide the output associated with the cycle having the most differing shape as being the anomaly.

Aspects of the present disclosure involve an innovative system for detecting an anomaly in time series sensor data. The system can include means for identifying a noisiest cycle from the time series sensor data; means for an evaluation of the noisiest cycle indicative of the anomaly being detected at a confidence level, providing an output associated with the noisiest cycle as being the anomaly; and means for the evaluation of the noisiest cycle indicative of the anomaly being detected not at the confidence level: identifying a cycle from the time series sensor data having a most differing shape; and providing the output associated with the cycle having the most differing shape as being the anomaly.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

The following detailed description following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 1:
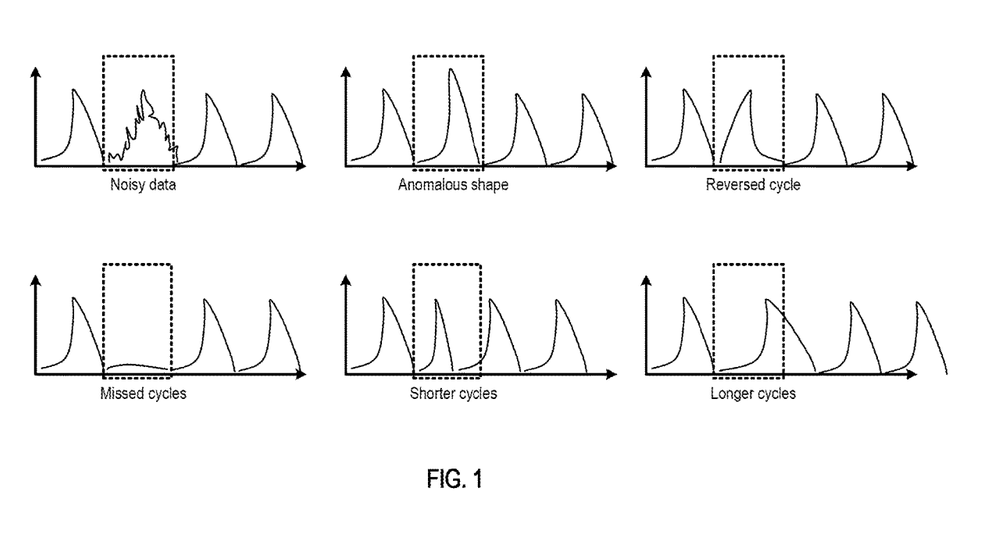
FIG. 1 illustrates examples of anomalous sensor data in industrial systems.

FIG. 1 illustrates examples of anomalous sensor data in industrial systems. The examples can be separated into two categories, noisy data and unusual cycle shape. The plot in the upper left corner illustrates an example of noisy data output with unusual noisy time series in the dotted area. The noisiness could be the result of sensor malfunctions associated with an industrial system. The other plots illustrate examples of anomalies associated with unusual cycle shape change within a window of a fixed size. As an example, the missing cycle in the first plot on the second row might be caused by stuck components in bearings. Similarly, the shorter cycles in the second plot on the second row might be due to over lubrication of bearings in an industrial machine/system. It is crucial to accurately identify these anomalous behaviors so that the proper intervention or remedial actions can be promptly taken.

Figure 2:
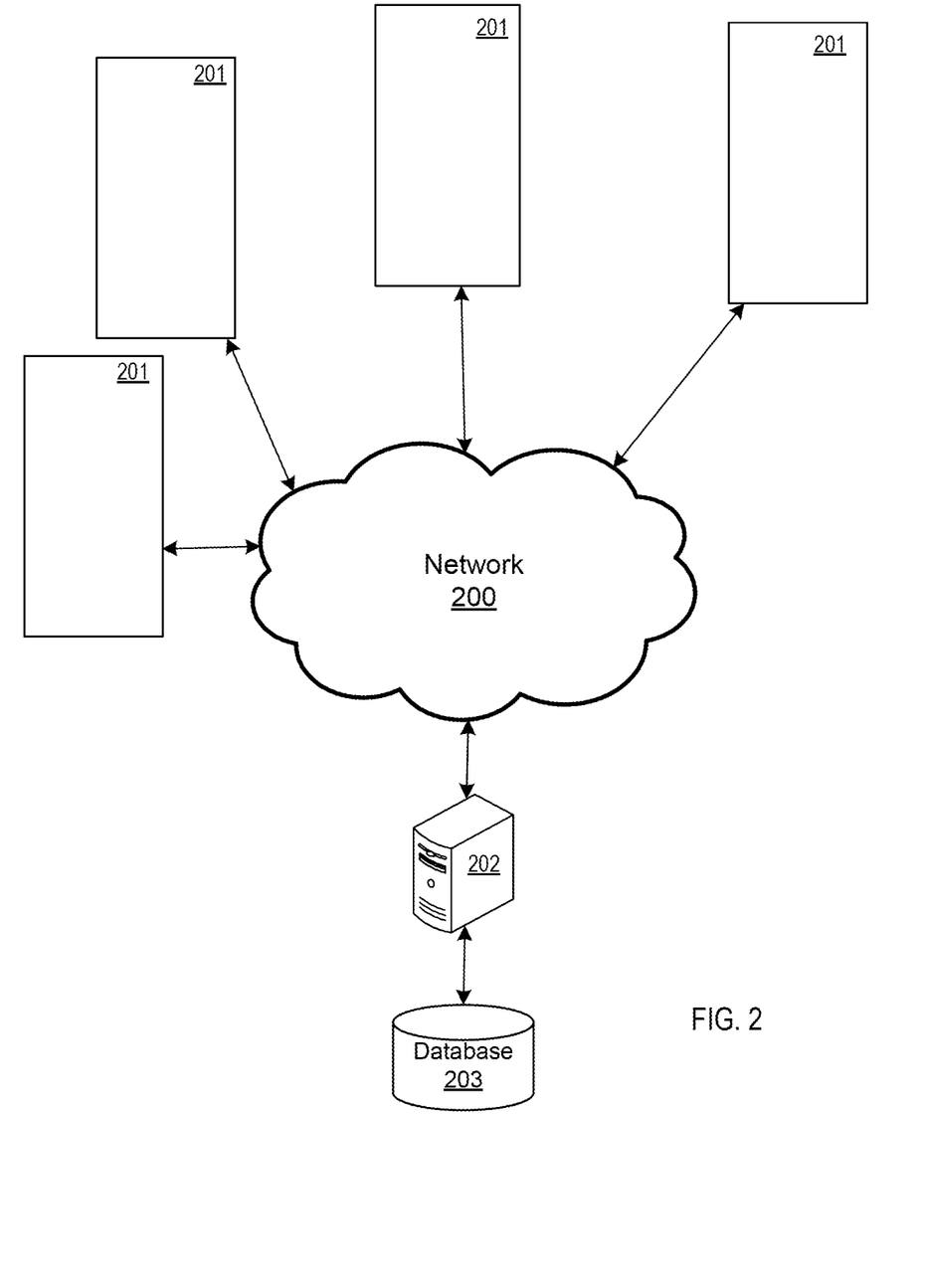
FIG. 2 illustrates an example flow process of an anomaly detection system involving a plurality of assets/industrial machines or systems, in accordance with an example implementation.

FIG. 2 illustrates a system involving a plurality of assets/industrial systems or machines networked to a management apparatus, in accordance with an example implementation. One or more asset systems 201 are communicatively coupled to a network 200 (e.g., local area network (LAN), wide area network (WAN)) through the corresponding on-board computer or Internet of Things (IoT) device of the asset systems 201, which is connected to a management apparatus 202. The management apparatus 202 manages a database 203, which contains historical data collected from the asset systems 201 and also facilitates remote control to each of the assets in the asset systems 201. In alternate example implementations, the data from the assets can be stored to a central repository or central database such as proprietary databases that intake data, or systems such as enterprise resource planning systems, and the management apparatus 202 can access or retrieve the data from the central repository or central database. Asset systems 201 can involve any physical system for use in a physical process such as an assembly line or production line, in accordance with the desired implementation, such as but not limited to air compressors, lathes, robotic arms, and so on in accordance with the desired implementation, and can also include an edge gateway that is configured to manage the underlying assets in the asset systems 201. The data provided from the sensors of such assets can serve as the data flows as described herein upon which analytics can be conducted, and the data is transmitted form the sensors of the assets to the edge gateways in the asset systems 201, whereupon such data can be processed with edge analytics or anomaly detection as described in the example implementations herein before management by the management apparatus 202.

Figure 3:
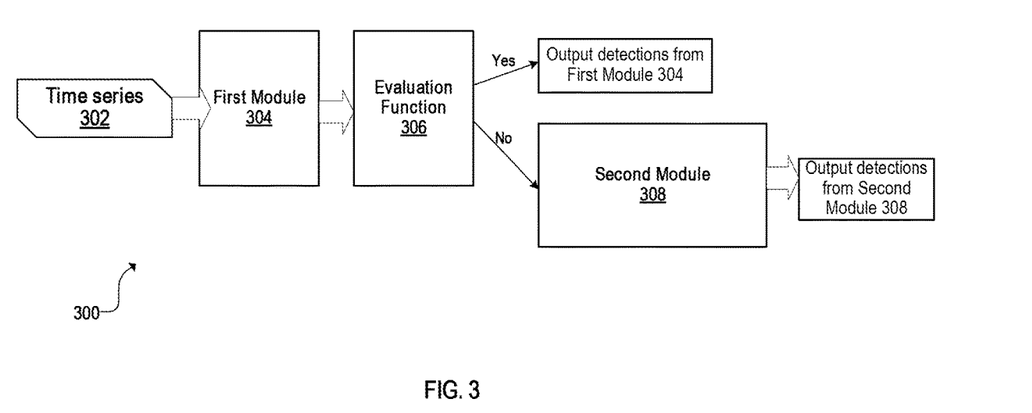
FIG. 3 illustrates a diagram showing an example anomaly detection system, in accordance with an example implementation.

FIG. 3 illustrates a diagram showing an example anomaly detection system 300, in accordance with an example implementation. The time series 302 is first processed by first module 304. First module 304 uses data smoothing techniques to estimate a smoothed curve for each data window and marks as anomaly the window with the largest difference between raw and smoothed data (i.e., roughness score). Following the processing at first module 304, an evaluation function 306 determines whether the module detections from first module 304 yielded a confident detection or not. The evaluation function quantifies the confidence level of the detection results from first module 304 by examining the number of extremely large roughness/noise scores detected against a threshold. In some example implementations, the threshold represents prior knowledge of number of anomalies in the data. In some example implementations, the threshold is associated to a single region or instance. If extremely large scores appear exactly in the single local region or instance, then the corresponding result from first module 304 has a high probability to be correct and the model outputs the detection as the final detection result.

Otherwise, if the confidence level is low, then the time series is passed to second module 308 to be further examined and detections from second module 308 are outputted. Second module 308 calculates minimal Dynamic Warping Distance (DTW) with multiple window sizes and adaptively selects the optimal subset of window sizes for an ensemble, based on a confidence level (i.e., the number of local regions having high DTW values). The multiple window sizes are dynamic and adjustable.

Both modules effectively handle time series with inconstant periodicities. First module 304 compares each window with its smoothed version, and therefore insensitive to misalignments of data among the windows. Second module 308 is also robust to varying periodicity time series since it uses the DTW distance in searching for the optimal non-linear way of warping the time series windows.

Figure 4:
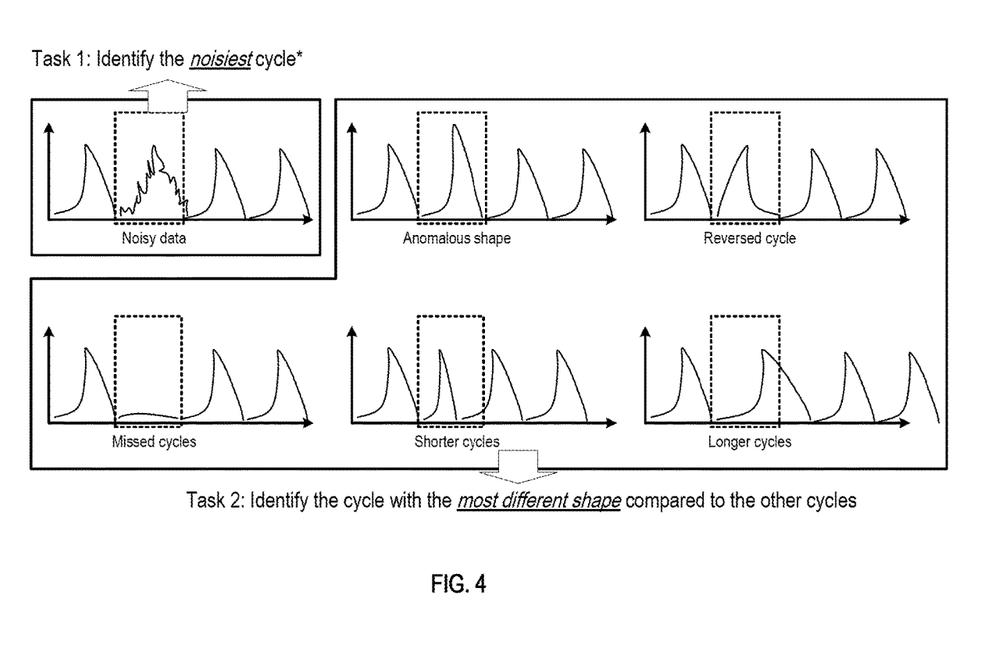
FIG. 4 illustrates task division between first module and second module.

To explicitly account for heterogeneous anomalies and achieve high detection accuracy, task division on noisy data and shaped-based anomalies between first module 304 and second module 308 is illustrated in FIG. 4. Task 1 is associated with the identification of the noisiest cycle, a function delegated to first module 304. Task 2 is associated with identification of cycle having the most different shape in comparison to the rest of the cycles, a function that is delegated to second module 308.

First Module: Anomaly Detection for Noisy Type Anomalies

Figure 5:
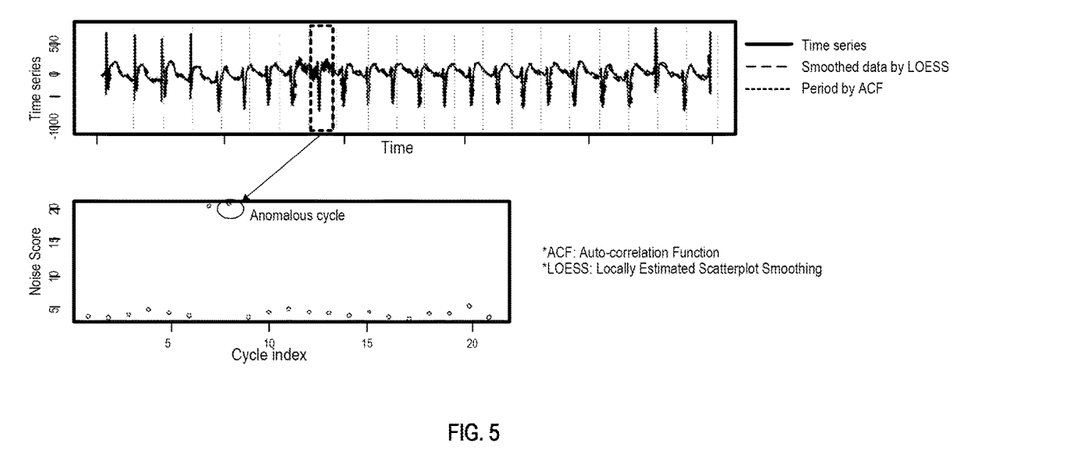
FIG. 5 illustrates an example chart showing a cycle/window with identified anomaly using first module, in accordance in some example implementations

FIG. 5 illustrates an example chart showing a cycle/window with identified anomaly using first module 304, in accordance in some example implementations. To identify the noisiest cycle associated with the time series sensor data, noise scores are derived and used to identify the anomaly. The periodicity of the time series is first estimated and cuts the time series into a sequence of cycles. In some example implementations, estimation of periodicity utilizes an Autocorrelation Function (ACF). A regression method is implemented to smooth the function for each cycle. In some example implementations, Locally Estimated Scatterplot Smoothing (LOESS) is used as the regression method, as shown in the top chart of FIG. 5, with the original time series in the i-th window denoted as $X_i$ and the corresponding smoothed data denoted as $\tilde{X}_i$.

Next, a roughness/noise score of the i-th window $M_i$ is derived. In some example implementations, derivation is based on a norm-based distance between actual data and the smoothed data, i.e., $$M_i = 0.5\|X_i - \tilde{X}_i\|_1 + 0.5\|X_i - \tilde{X}_i\|_2$$

where $\|\cdot\|_1$ and $\|\cdot\|_2$ are the l1 and l2 norm, respectively. The cycle/window having a highest one of the noise scores is considered as the anomalous cycle, i.e., $$\text{Detection}_{First\,Module} = \arg\max_i M_i$$

as illustrated in the bottom chart of FIG. 5.

Evaluation Function

The anomaly detection method of first module 304 directly targets the noisy data type of anomaly and tends to be inefficient for shape-based anomalies. Therefore, an automatic rule is needed to determine whether first module 304 is suitable for a given time series. Since there is only one prominent anomalous cycle in any given time series, first module 304 generates a confident detection if extremely large noise scores appear exactly at one region. Otherwise, it has low confidence about the detection.

In some example implementations, Interquartile Range rule (IQR) is utilized to verify the existence of extremely large scores in the noise scores from first module 304. Let $M_{0.1}$ and $M_{0.9}$ be the 10% and 90% percentile of the roughness score. A score $M_i$ is considered as an extremely large value if:

$$M_i \geq M_{0.9} + 3(M_{0.9} - M_{0.1})$$

Figure 6:
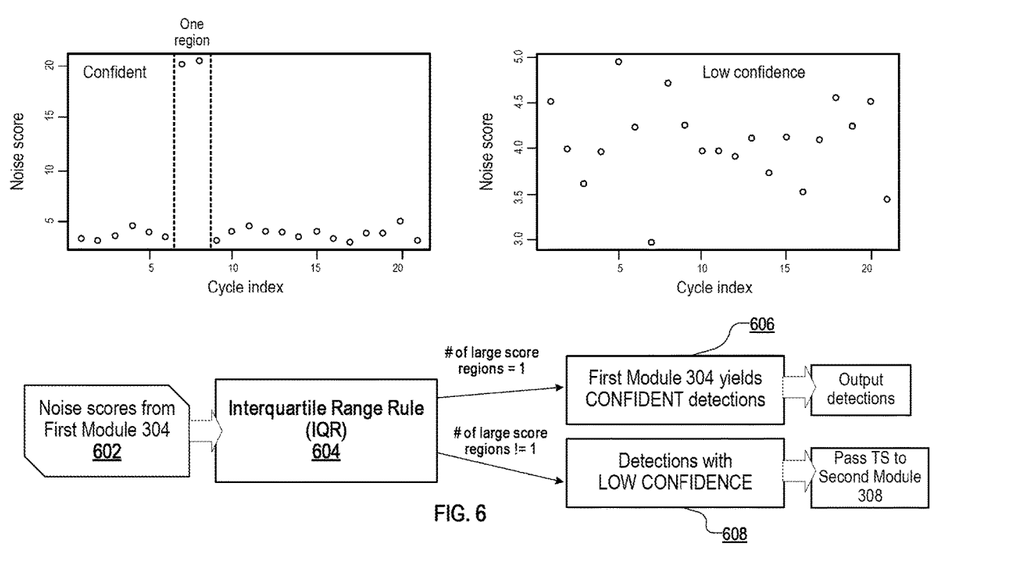
FIG. 6 illustrates an example confident level determination process, in accordance in some example implementations.

FIG. 6 illustrates an example confident level determination process, in accordance in some example implementations. The number of regions of cycles having extremely large values is determined by the number of non-adjacent outlying windows. For instance, in the first plot in FIG. 6, there exists only a single outlying region. Whereas in the second plot, there is not a single outlying region but a large number of regions of cycles having high noise scores. If the number of outlying regions equates to a single instance or 1, the detection is confident.

At 602, noise scores from first module 304 are received. At 604, an IQR is utilized to verify the existence of extremely large scores among the noise scores of first module 304. If the number of regions of cycles having extremely large score equates to a threshold of 1, then it is determined that first module 304 is yielding confident detections at 606, and the detections are outputted. On the other hand, if the number of regions of cycles having extreme large score exceeds the threshold of 1, then it is determined that first module 304 is yielding detections having low confidence level, and time series are passed to second module 308 to be further processed.

Second Module 308: Anomaly Detection for Shape-Based Anomalies

Second module 308 aims to identify a data window of a pre-defined length that exhibits the most different shape, compared to the other windows of the same length. The magnitude of a shape-based anomaly is quantified at time t by the minimal distance between itself and all the other non-naïve window among the entire time series.

To handle the inconstant periodicity in time series, one example implementation involves the use of the Dynamic Time Warping (DTW) distance, rather than Euclidean distance used in the matrix profiling approach, since it uses the DTW distance that searches for the optimal non-linear way of warping the time series windows. Let $X_\omega^{(t)} = [X_{t-\omega-1}, \ldots, X_t]^T$ be the window of length $\omega$ at time t. The DTW distance between $X_\omega^{(t)}$ and a non-naïve candidate $X_\omega^{(t')}$ is:

$$DTW_\varsigma(X_\omega^t, X_\omega^{t'}) = \min_{\pi \in A(X_\omega^{(t)}, X_\omega^{t'})} \sqrt{\sum_{(i,j) \in \pi} (X_i^{(t)} - X_j^{(t')})^2}$$

Here, an alignment path π of length ω is a sequence of index pairs (i.e., $(i_0, j_0), \ldots, (i_{\omega-1}, j_{\omega-1})$) and $A(X_\omega^{(t)}, X_\omega^{(t')})$ is the set of all admissible paths that satisfy the following conditions.

i) Beginning and end of time series are matched together. Namely, $\pi_0 = (i_0, j_0) = (0,0)$ and $\pi_{\omega-1} = (i_{\omega-1}, j_{\omega-1}) = (\omega-1, \omega-1)$.

ii) The sequence is monotonically increasing in both i and j and all the time series indexes should appear at least once. Formally, $i_{u-1} \leq i_u \leq i_{u-1}+1$ and $j_{u-1} \leq j_u \leq j_{u-1}+1$ for $u=0, \ldots, \omega-1$.

iii) The maximum number of points any timestamp can link to is $\varsigma$ % of the length of the time series ω.

Given this definition, the anomaly score at time t is $$S_{\varsigma,\omega}(t) = \min_{t' \in T^t} DTW_\varsigma(X_\omega^{(t)}, X_\omega^{(t')})$$

Figure 7:
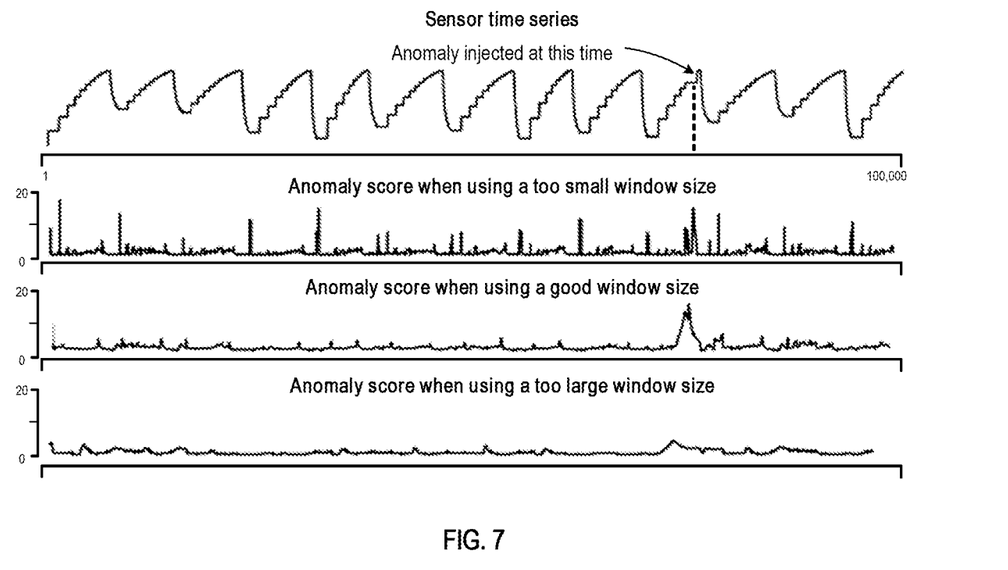
FIG. 7 illustrates examples of anomaly scoring utilizing various window sizes.

FIG. 7 illustrates examples of anomaly scoring utilizing various window sizes. As illustrated, the sliding window length ω play a key role. The anomaly score gets noisy with prominent scores at various timestamps when the window size is too small. On the other hand, when the window size is too large, the anomaly score of the anomalous window is not distinguishable from the normal windows. Hence, an appropriate window length is needed for purposes of identifying single instance anomaly.

Figure 8:
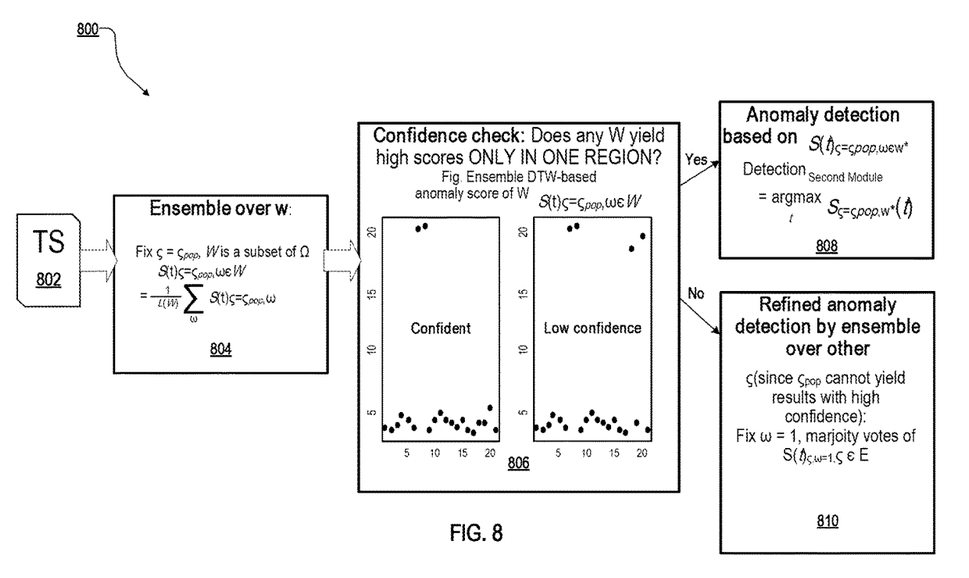
FIG. 8 illustrates an example flow process of second module, in accordance in some example implementations.

FIG. 8 illustrates an example flow process 800 of second module 308, in accordance in some example implementations. The warping size limit $\varsigma$ is known to affect the detection results. To improve detection accuracy, an adaptive ensemble method is utilized. The method begins by receiving time series at 802. This is followed by fixing the DTW warping size at the popularly used level $\varsigma_{pop}$| (i. e., $\varsigma = 10\%$). The DTW distance is then calculated at any timestamp using several sliding window lengths, also known as an ensemble, ranging from $1_{lower}$ (e. g., 0.5) times to $1_{upper}$ (e. g., 1.75) times of the period learned from the autocorrelation function approach. The average DTW distance is then obtained using different subsets of the sliding window lengths. Let W be a specific subset of the sliding window lengths (e.g., W={0.5*period, 1*period}), then at 804, the ensemble DTW using W is:

$$S_{\varsigma=\varsigma_{pop},W}(t) = \frac{1}{L(W)} \sum_{\omega \in W} S_{\varsigma,\omega}(t)$$

where L(W) is the number of elements in W.

For a given time series, to select the appropriate subset W*, the number of regions with abnormally high ensembled DTW distances is examined through a confidence check 806. From which, the subset that yields high average DTW distance in a single region is used, since there is higher confidence in the corresponding detection. Once W* is determined, the anomaly detection 808 is then made based on the W* to identify the cycle associated with the single region, and the corresponding detection becomes:

$$\text{Detection}_{Second\ Module} = \text{argmax}_t S_{\varsigma=\varsigma_{pop},W^*}(t)$$

For some time series, it is possible that not a single subset yields the desired pattern where high ensembled DTW-based anomaly scores appear in one region. An example is shown in the right chart of 806, where multiple regions of high ensembled DTW-based anomaly scores indicate a low confidence level. This indicates that the popularly used $\varsigma_{pop}$ warping size is inappropriate for this time series, and thus further examination of top candidates nominated by the ensembled DTW-based anomaly scores with warping size $\varsigma_{pop}$ is needed at 810. The DTW distance of the potential anomalies then needs to be re-calculated using K other feasible warping sizes and select the final anomaly location based on the scores with these other feasible warping sizes. A preferred embodiment of selection is to use the majority vote method. In particular, let C denote the set of top candidate anomalies nominated by the ensembled DTW-based anomaly detection method with warping size $\varsigma_{pop}$. Let E be the set of K other feasible warping sizes, e.g., E={2%, 2.5%, …, 7%}). The window length is fixed at the period determined by the autocorrelation function approach, specifically, ω=1, W={1*period}. Then, for each $\varsigma \in E$, a new score $S_{\varsigma,\omega=1}$ is calculated for each candidate c∈C. The candidate with the highest score is selected as the potential anomaly location with warping size $\varsigma$, denoted by $c_\varsigma$. Finally, the candidate c that has been selected by most warping sizes in E is output as the detected anomaly location.

Figure 9:
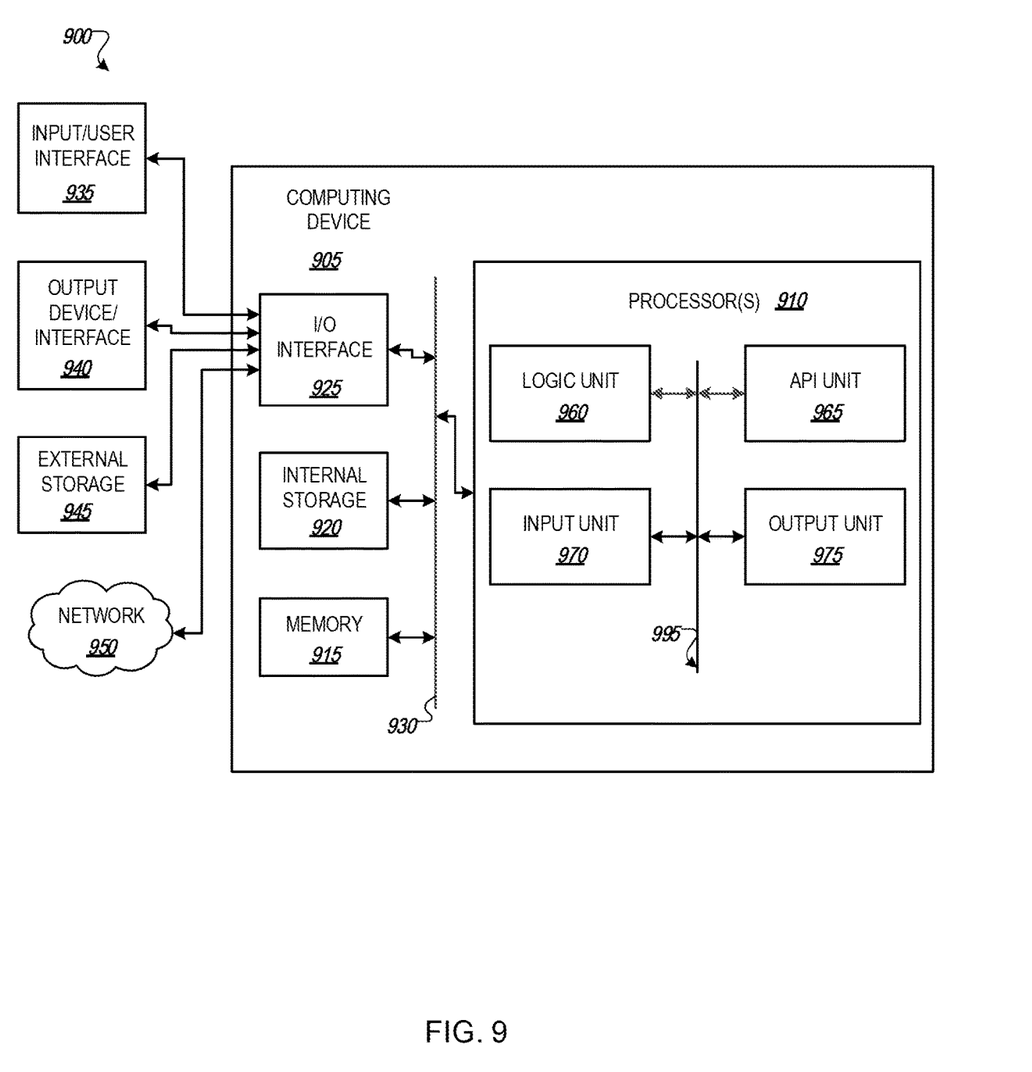
FIG. 9 illustrates an example computing environment with an example computer device suitable for use in some example implementations.

FIG. 9 illustrates an example computing environment with an example computer device suitable for use in some example implementations. Computer device 905 in computing environment 900 can include one or more processing units, cores, or processors 910, memory 915 (e.g., RAM, ROM, and/or the like), internal storage 920 (e.g., magnetic, optical, solid-state storage, and/or organic), and/or IO interface 925, any of which can be coupled on a communication mechanism or bus 930 for communicating information or embedded in the computer device 905. IO interface 925 is also configured to receive images from cameras or provide images to projectors or displays, depending on the desired implementation.

Computer device 905 can be communicatively coupled to input/user interface 935 and output device/interface 940. Either one or both of the input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via IO interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

IO interface 925 can include but is not limited to, wired and/or wireless interfaces using any communication or IO protocols or standards (e.g., Ethernet, 1902.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided. Processor(s) 910 can be in the form of hardware processors such as central processing units (CPUs) or in a combination of hardware and software units.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, the input unit 970, the output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide an output based on the calculations described in example implementations.

Processor(s) 910 can be configured to identify a noisiest cycle from the time series sensor data. The processor(s) 910 may also be configured, for an evaluation of the noisiest cycle indicative of the anomaly being detected at a confidence level, provide an output associated with the noisiest cycle as being the anomaly. The processor(s) 910 may further be configured to, for the evaluation of the noisiest cycle indicative of the anomaly being detected not at the confidence level, identify a cycle from the time series sensor data having a most differing shape and provide the output associated with the cycle having the most differing shape as being the anomaly. The processor(s) 910 may further be configured to obtain the time series sensor data from an internet of things (IoT) device over a network.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed:

1. A method for detecting an anomaly in time series sensor data, the method comprising:
   identifying a noisiest cycle from the time series sensor data;
   for an evaluation of the noisiest cycle indicative of the anomaly being detected at a confidence level:
      providing an output associated with the noisiest cycle as being the anomaly;
      using an interquartile range rule (IQR) to identify regions of cycles of noise scores having high values, wherein a single region of the regions of cycles is a group of adjacent outlying cycles;
      summing a number of the identified regions of cycles of noise scores having high values; and
      determining the confidence level by comparing the summed number of the identified regions of cycles of noise scores having high values against a threshold;
   for the evaluation of the noisiest cycle indicative of the anomaly being detected not at the confidence level:
   identifying a cycle from the time series sensor data having a most differing shape, wherein the identifying comprises calculating dynamic time warping (DTW) distancing associated with a plurality of window sizes from the time series sensor data to find the cycle having the most differing shape, and calculating average DTW distances associated with ensembles of subsets of the plurality of window sizes;
   providing the output associated with the cycle having the most differing shape as being the anomaly; and
   using the anomaly to detect a malfunction in a manufacturing environment.

2. The method of claim 1, the identifying the noisiest cycle from the time series sensor data comprises:
   estimating a periodicity of the time series sensor data and cutting the time series sensor data into a sequence of cycles;
   using a regression model to smooth the sequence of cycles through a window;
   deriving noise scores associated with the sequence of cycles using the smoothed sequence of cycles; and
   selecting a cycle with a highest one of the noise scores as the noisiest cycle.

3. The method of claim 1, wherein the plurality of window sizes is dynamic and adjustable.

4. The method of claim 1, the identifying the cycle from the time series sensor data having the most differing shape further comprising:
   filtering the ensembles and the calculated average DTW distances to find an ensemble with a single instance of high average DTW distance;
   finding a cycle associated with the single instance of high average DTW distance and identifying it as a single instance cycle; and
   selecting the single instance cycle as the cycle having the most differing shape.

5. The method of claim 1, further comprising:
   obtaining the time series sensor data from an internet of things (IoT) device over a network.

6. A non-transitory computer readable medium, storing instructions for detecting an anomaly in time series sensor data detecting an anomaly in time series sensor data, the instructions comprising:
   identifying a noisiest cycle from the time series sensor data;
   for an evaluation of the noisiest cycle indicative of the anomaly being detected at a confidence level:
      providing an output associated with the noisiest cycle as being the anomaly;
      using an interquartile range rule (IQR) to identify regions of cycles of noise scores having high values, wherein a single region of the regions of cycles is a group of adjacent outlying cycles;
      summing a number of the identified regions of cycles of noise scores having high values; and
      determining the confidence level by comparing the summed number of the identified regions of cycles of noise scores having high values against a threshold;
   for the evaluation of the noisiest cycle indicative of the anomaly being detected not at the confidence level:
      identifying a cycle from the time series sensor data having a most differing shape, wherein the identifying comprises calculating dynamic time warping (DTW) distancing associated with a plurality of window sizes from the time series sensor data to find the cycle having the most differing shape and calculating average DTW distances associated with ensembles of subsets of the plurality of window sizes;
      providing the output associated with the cycle having the most differing shape as being the anomaly; and
      using the anomaly to detect a malfunction in a manufacturing environment.

7. The non-transitory computer readable medium of claim 6, the identifying the noisiest cycle from the time series sensor data comprises:
   estimating a periodicity of the time series sensor data and cutting the time series sensor data into a sequence of cycles;

using a regression model to smooth the sequence of cycles through a window;

deriving noise scores associated with the sequence of cycles using the smoothed sequence of cycles; and selecting a cycle with a highest one of the noise scores as the noisiest cycle.

8. The non-transitory computer readable medium of claim 6, wherein the plurality of window sizes is dynamic and adjustable.

9. The non-transitory computer readable medium of claim 6, the identifying the cycle from the time series sensor data having the most differing shape further comprising:

filtering the ensembles and the calculated average DTW distances to find an ensemble with a single instance of high average DTW distance;

finding a cycle associated with the single instance of high average DTW distance and identifying it as a single instance cycle; and selecting the single instance cycle as the cycle having the most differing shape.

10. The non-transitory computer readable medium of claim 6, the instructions further comprising:

obtaining the time series sensor data from an internet of things (IoT) device over a network.

11. A management server system for detecting an anomaly in time series sensor data, the system comprising:

a processor, configured to:

identify a noisiest cycle from the time series sensor data;

for an evaluation of the noisiest cycle indicative of the anomaly being detected at a confidence level:

provide an output associated with the noisiest cycle as being the anomaly;

use an interquartile range rule (IQR) to identify regions of cycles of noise scores having high values, wherein a single region of the regions of cycles is a group of adjacent outlying cycles;

sum a number of the identified regions of cycles of noise scores having high values; and determine the confidence level by comparing the summed number of the identified regions of cycles of noise scores having high values against a threshold;

for the evaluation of the noisiest cycle indicative of the anomaly being detected not at the confidence level:

identify a cycle from the time series sensor data having a most differing shape, wherein the identifying comprises calculating dynamic time warping (DTW) distancing associated with a plurality of window sizes from the time series sensor data to find the cycle having the most differing shape, and calculating average DTW distances associated with ensembles of subsets of the plurality of window sizes;

provide the output associated with the cycle having the most differing shape as being the anomaly; and use the anomaly to detect a malfunction in a manufacturing environment.

12. The management server system of claim 11, the identifying the noisiest cycle from the time series sensor data comprises:

estimating a periodicity of the time series sensor data and cutting the time series sensor data into a sequence of cycles;

using a regression model to smooth the sequence of cycles through a window;

deriving noise scores associated with the sequence of cycles using the smoothed sequence of cycles; and selecting a cycle with a highest one of the noise scores as the noisiest cycle.

13. The management server system of claim 11, the processor is further configured to obtain the time series sensor data from an internet of things (IoT) device over a network.

* * * * *